Figure 1:
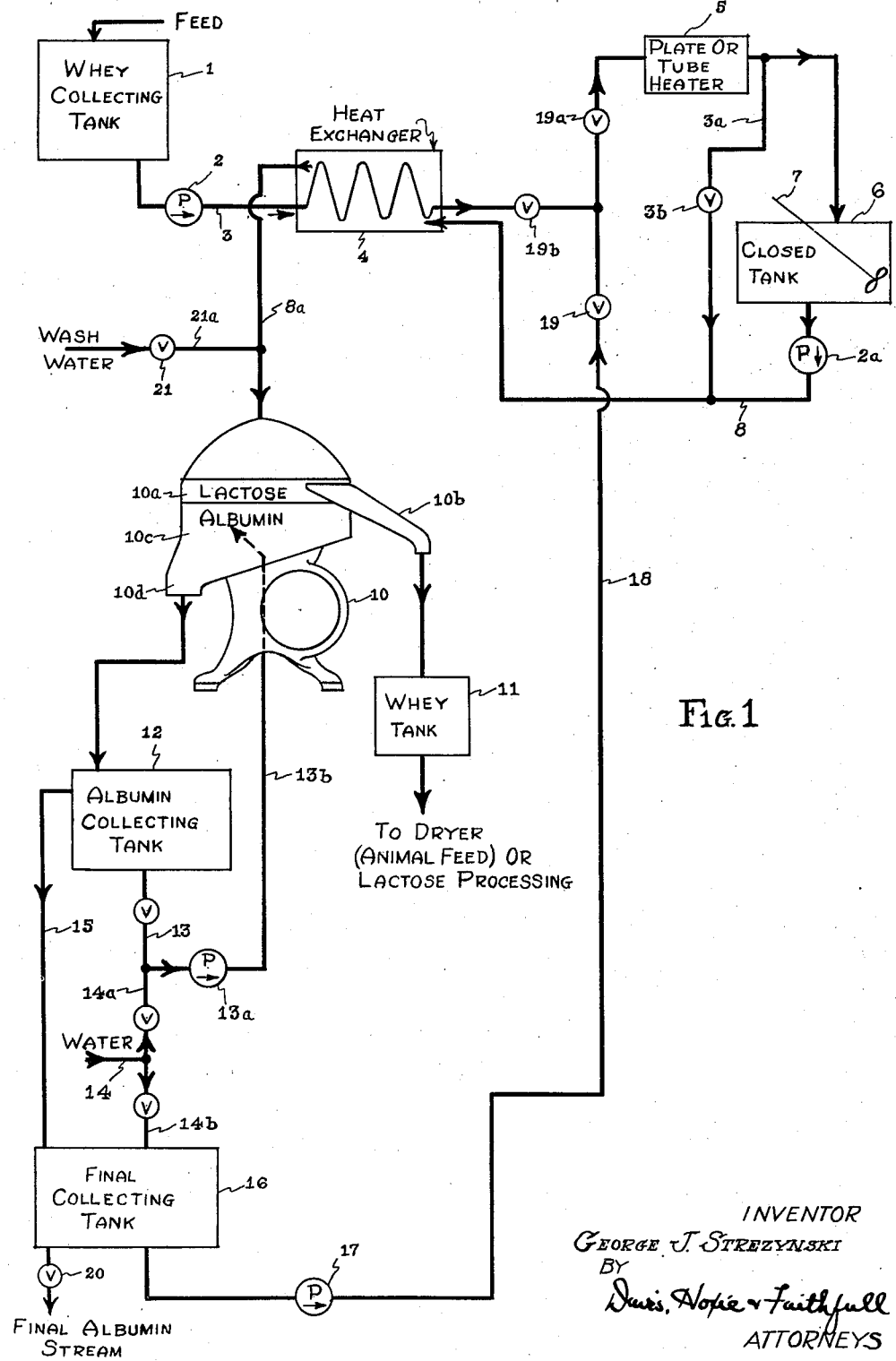

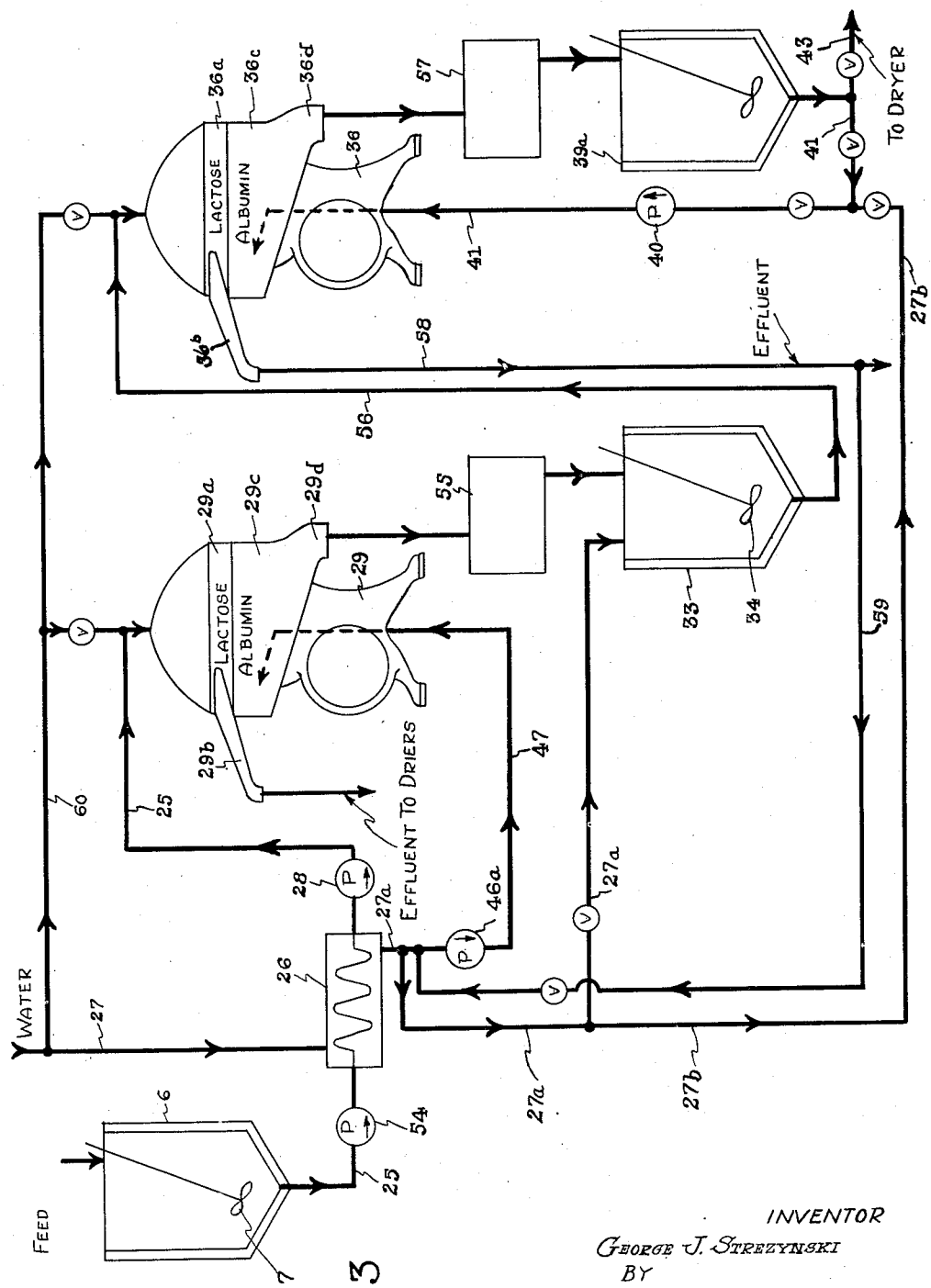

Patented Aug. 29, 1950

2,520,615

UNITED STATES PATENT OFFICE 2,520,615

PROCESS FOR RECOVERY OF LACTALBUMIN

George J. Strezynski, Poughkeepsie, N. Y., assignor to The De Laval Separator Company, New York, N. Y., a corporation of New Jersey Application June 27, 1947, Serial No. 757,636

19 Claims. (Cl. 260—122)

This invention relates to the production of lactalbumin and more particularly to an improved process for treating casein whey or cheese whey to concentrate and purify the albumin.

Lactalbumin has many uses, among which is its use in the pharmaceutical field, as for treating stomach ulcers and cases of malnutrition. In pharmaceutical uses particularly, it is necessary to obtain the albumin in a condition in which it is substantially free of lactose and other impurities in the whey. The whey may contain five percent or more of lactose, which is greatly in excess of the amount of albumin normally in the whey, and the problem of removing this relatively large amount of lactose has been a serious obstacle to production of lactalbumin commercially. Moreover, the amount of albumin contained in the whey, usually one-half of one percent or less, is far less than the albumin concentration desired in the final product, so that it is also necessary to increase the albumin concentration many times even as much as twenty times over its concentration in the original whey.

The primary object of the present invention resides in the provision of an improved process for treating whey to obtain a highly concentrated and purified albumin product by a continuous or substantially continuous operation which is particularly suited for commercial production.

One feature of the invention is an albumin recovery process in which the whey, adjusted to a certain acidity, is first heated to a predetermined temperature at which it is held for a period sufficient to precipitate the albumin, and is then cooled to a somewhat lower temperature and centrifuged to separate whey and lactose from the albumin, the treatment being preferably effected continuously and with at least part of the separated albumin being subsequently diluted and recentrifuged while recycling albumin concentrate in the second centrifugation.

Another feature is a process of the character described in which the whey, after the albumin precipitating operation, is passed in heat exchange relation to the albumin diluent or the whey flowing to the precipitating operation, or both, to effect the necessary temperature conditions.

An additional feature resides in the provision of a process of the character described in which centrifugally separated whey is returned to a prior centrifugal separating operation or to the albumin precipitating operation, or both, to increase the yield from the process.

According to the invention, the whey is collected in a tank where, preferably at substantially room temperature, the acidity of the whey is adjusted to a pH value between 4 and 7. I have found that adjustment of the acidity to a pH of 4.5 is advantageous to obtain in the subsequent steps a mixture adapted for good centrifugal separation, regardless of whether cheese whey or casein whey is used. Consequently, I prefer to adjust the pH value to about 4.5. The acidity may be adjusted by adding a non-toxic acid, such as hydrochloric acid, or a non-toxic base, such as sodium hydroxide.

The whey is then heated to a temperature of about 165° to 190° F., after which the albumin is precipitated out to form a mixture of whey and precipitated albumin containing lactose. Preferably, the precipitating operation is effected in a closed tank while subjecting the whey to a mild agitation. The mixture is then preferably cooled to a temperature of about 130° to 170° F. and fed to a centrifugal separator having a two way discharge. In the separator bowl or locus of centrifugal force, the mixture is separated into an inner annulus forming a whey and lactose constituent, and an outer annulus forming an albumin constituent to which water may be added during the centrifuging. The albumin constituent discharged from the locus still contains some lactose, although the albumin concentration is increased many times, as much as ten times, over the albumin concentration in the original whey. This albumin concentrate is accumulated in a collecting tank and diluted and washed with water. The amount of water added to the albumen concentrate is preferably greater than the amount of concentrate and may be as much as ten times the volume of the concentrate. The diluted concentrate is then recentrifuged at a temperature within the range of 130° to 170° F., the diluted concentrate being first heated if necessary to obtain this temperature condition.

In the second centrifuging, the albumin constituent is further concentrated, and additional lactose is removed from the albumin. The whey separated from the albumin in the latter operation contains most of the remaining lactose, so that the albumin constituent discharged in the second centrifuging contains only a small trace of lactose, usually considerably less than 0.5 percent. Part of the albumin concentrate thus obtained, after diluting it with water if desired, is then recycled to the last centrifugal separating operation where, by feeding the recycled concentrate to the peripheral part of the separator bowl, the concentration of the discharged albumin constituent is controlled. The part of the discharged albumin constituent which is not recycled in the second centrifugal separation is withdrawn from the system. This concentrated albumin constituent will be substantially free of lactose.

In one form of the invention, part of the albumin constituent discharged from the first centrifugal separation is diluted and recycled to the first separating operation, to control the albumin concentration, and the remainder is collected in a tank until a substantial volume of the albumin concentrate has been accumulated. The concentrate is then diluted and returned to the centrifugal bowl, preferably after such heating of the concentrate as is necessary to attain a temperature of 130° to 170° F., the second separation being also effected while recirculating some of the discharged albumin constituent to the separator bowl. In this way, the two centrifugal operations may be carried out with only one centrifuge.

In another form of the invention, the albumin concentrate from the first centrifuge is diluted with water and fed to a second centrifuge for the further concentration, and whey discharged from this second stage is returned in diluted form to the first centrifuge or is returned to the albumin precipitating operation, or both, to increase the yield. Thus, in both forms of the invention there is in each separating stage a recirculation of separated material from either that stage or the subsequent stage, whereby the albumin concentration is controlled and a highly purified albumin is obtained substantially free of lactose.

Figure 2:
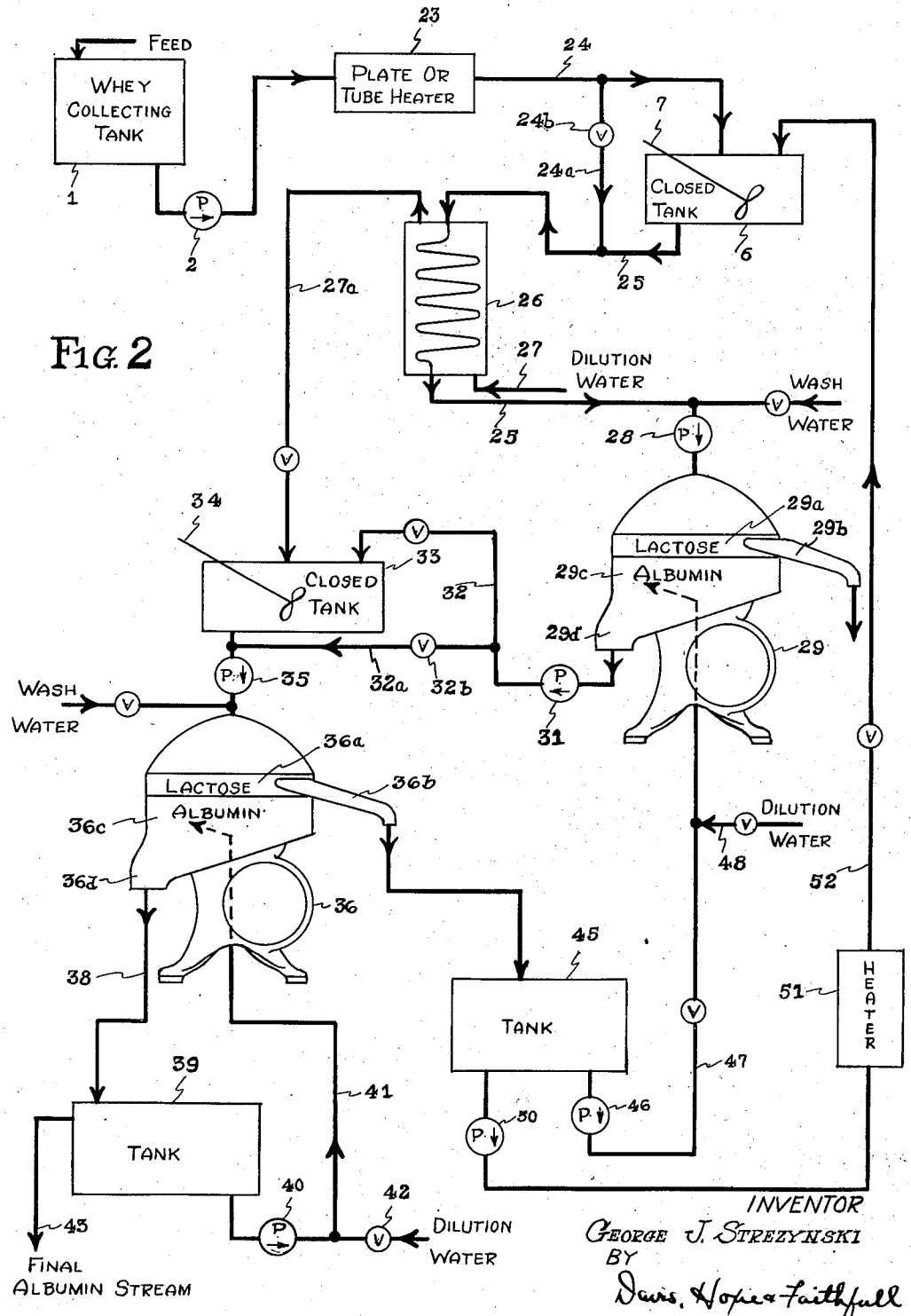

For a better understanding of the invention, reference may be had to the accompanying drawings, in which Fig. 1 is a schematic view of a system for use in practicing the invention in which a single centrifuge is used for both separating operations;

Fig. 2 is a similar view of another form of system for practicing the invention, in which the separating operations are effected in two serially connected centrifuges, and Fig. 3 is a similar view of a modification of the system shown in Fig. 2.

Referring to Fig. 1, the system there shown comprises a collecting tank 1 for receiving the whey to be treated. For illustrative purposes, it will be assumed that the whey in the tank 1 contains five percent of lactose and one-half of one percent of albumin, which is fairly representative of casein and cheese wheys generally available for commercial use. According to the invention, the acidity of the whey in tank 1 is first adjusted to a pH value between 4 and 7, preferably a pH of about 4.5. The acidity adjustment may be made by adding a suitable acid or basic material to the whey in the tank 1, which is preferably held at about room temperature.

The material from tank 1 is fed by a pump 2 through a pipe line 3 which extends through a heat exchanger 4 to a heater 5 of the plate or tube type. In its flow through heater 5, the whey is heated to a temperature of about 180° F. The heated whey is then fed into a closed tank 6 where a substantial body of the whey is accumulated. The whey is held in the tank 6 for a period of time sufficient to precipitate the albumin, and during this time, which may be considerably less than thirty minutes, the whey is preferably subjected to a mild agitation by means of a stirrer 7. As a result, a mixture of whey and precipitated albumin containing lactose will be formed in the lower part of the tank 6. This mixture is delivered from the bottom of the tank 6 by pump 2ª through a pipe 8 leading to the heat exchanger 4. In the exchanger 4, the heated whey gives up some of its heat to the whey flowing to the plate heater through pipe 3. Accordingly, the whey in pipe 3 is preheated to reduce the energy consumption in heater 5, and the whey delivered to the heat exchanger through pipe 8 is cooled to a temperature of about 130° to 150° F.

In some instances, depending upon the characteristics of the whey, the albumin may be precipitated without accumulating the whey in tank 6, in which case some or all of the whey from heater 5 may be by-passed around the tank 6 through a by-pass line 3ª controlled by a valve 3ᵇ.

The whey delivered to the heat exchanger through pipe 8 is fed, after the cooling operation, through pipe 8ª to a centrifugal separator 10. The separator 10 may be of the type disclosed in my Patent No. 2,141,025, granted December 30, 1938, in which the centrifugal bowl is provided with a central inlet for the feed, a more or less central outlet for the separated lighter constituent, and a series of peripheral outlets for the separated heavier constituent. More particularly, the outlet for the lighter constituent is disposed near the axis of rotation and discharges the separated lighter constituent into a stationary cover 10ª having a spout 10ᵇ, and the separated heavier constituent is discharged through nozzles in the outer periphery of the bowl and collected in a stationary cover 10ᶜ having a spout 10ᵈ. In the separating chamber of the centrifuge 10, the feed entering from pipe 8ª is separated into an inner annulus or lighter constituent comprising mainly whey, and an outer annulus or heavier constituent comprising albumin concentrate. The lighter constituent (which will hereafter be referred to as the separated whey constituent) is discharged continuously through spout 10ᵇ into a collecting tank 11, from which it may be delivered for further processing to obtain a material suitable for animal feed. The separated heavier constituent (which will hereafter be referred to as the albumin concentrate) is discharged through spout 10ᵈ into a collecting tank 12.

Because of the treatment previously described, for every 100 parts of whey fed to the centrifuge 10, approximately 90 parts of separated whey constituent will be discharged through spout 10ᵇ, and approximately 10 parts of albumin concentrate will be discharged through spout 10ᵈ, the concentrate containing about 5% of lactose and 5% of albumin.

Part of the albumin concentrate in tank 12 is diluted and returned to the separating bowl of centrifuge 10, as disclosed in my co-pending application Serial No. 695,875, filed September 10, 1946, now Patent No. 2,500,101, of which this application is a continuation-in-part. As shown, the recirculated part of the albumin concentrate is fed continuously through a pipe 13 where it is diluted with water delivered from a pipe 14 and a branch pipe 14ª. The rate of feed through pipe 13 may be approximately one-half the rate of discharge of the albumin concentrate from spout 10ᵈ, and the feed through pipe 13 may be diluted with about an equal part of water from pipe 14ª. The diluted albumin concentrate is forced by a pump 13ª through pipe 13ᵇ into the separating chamber of centrifuge 10, preferably at the outer part of the chamber near the discharge nozzles for the albumen concentrate, as disclosed in my above-identified co-pending application. The water added to the concentrate in pipe 13 will dissolve the soluble impurities, such as sugar, in the albumin concentrate and will subject the latter to a washing action in the centrifuge 10. The added water with its dissolved and suspended impurities will move inwardly toward the central outlet of the centrifuge and join the separated whey constituent, while the recycled albumin after the washing action will discharge through the peripheral nozzles along with newly separated albumin concentrate from the material delivered by feed pipe 8a. By controlling the rate of recycling through pipe 13b, and the extent to which the recycled concentrate is diluted from pipe 14a, the albumin concentration in the discharge through spout 10d may be regulated.

The part of the albumin concentrate in tank 12 which is not recycled to the centrifuge is delivered by pipe 15 to collecting tank 16 where it is diluted with water fed through a branch pipe 14b from pipe 14. The extent to which the concentrate is diluted in tank 16 is considerably greater than the dilution of the recycled concentrate in pipe 13. As an example, I contemplate adding ten parts of water to one part of albumin concentrate in tank 16. When the batch of whey from the collecting tank 1 has been processed as described, the diluted concentrate in tank 16 is fed by a pump 17 through pipe 18 to the pipe 3, the valves 19 and 19a being opened and the valve 19b being closed. The diluted concentrate is re-passed through heater 5 and flows through by-pass 3a and pipes 8 and 8a back to the inlet to the centrifuge 10. If desired, some or all of the diluted concentrate may be fed into tank 6 and held for a period of time sufficient to precipitate additional albumin. By means of the heater 5, the temperature of the concentrate repassed to the centrifuge is raised to about 130° to 150° F., in case the concentrate has previously cooled to below this temperature range.

After the second separating operation in centrifuge 10, the separated whey and albumin constituents will be discharged through the spouts 10b and 10d, respectively, in the ratio of about 90 parts of separated whey to 10 parts of albumin concentrate. In this second stage, part of the discharged albumin concentrate is diluted and recycled to the centrifuge bowl, as in the first stage, to effect a washing action and control the concentration of the heavier discharge. Thus, the concentrate from spout 10d will now contain only about ½ of 1% of lactose, the albumin content being approximately 5%. The final albumin concentrate in the collecting tank 16 is therefore substantially free of lactose, and the albumin is concentrated to a degree such that it can be used commercially. The final albumin concentrate may be withdrawn from tank 16 through a valve 20, which is opened when the second stage operation has been completed.

The separating bowl of centrifuge 10 may be cleaned at desired intervals by introducing wash water through valve 21 and pipes 21a and 8a to the inlet of the bowl.

Referring now to Fig. 2, the whey from tank 1, acidulated to a pH value of about 4.5 as previously described, is fed by a pump 2 directly to a plate or tube heater 23 where the whey is heated to a temperature of about 180° F. From heater 23, the whey passes through a pipe 24 into the closed tank 6 where it is held to precipitate the albumin, the whey being agitated if necessary by the stirrer 7. The mixture of whey and precipitated albumin is fed from the bottom of tank 6 through a pipe 25 to a heat exchanger 26. It will be understood that in cases where the albumin can be precipitated without holding the whey in tank 6, the whey or part of it may be fed from heater 23 directly to pipe 25 through by-pass 24a controlled by valve 24b. In the heat exchanger 26, the heated whey is passed in counter-flow, heat exchange relation to water which is fed to the exchanger through pipe 27. In this way, the water from pipe 27 is heated to a temperature of about 150° F. and discharged through a pipe 27a, while the mixture of whey and precipitated albumin is cooled to a temperature of about 150° F.

The mixture of whey and precipitated albumin, after the cooling operation in heat exchanger 26, is delivered by pipe 25 and pump 28 to a centrifuge 29 of the type previously described. In the centrifuge 29, the mixture is separated into a lighter constituent comprising mainly whey and lactose, and a heavier constituent comprising albumin concentrate, these constituents being separately discharged into covers 29a and 29c having spouts 29b and 29d, respectively. The albumin concentrate from spout 29d is fed through pump 31 and pipe 32 to a closed tank 33 where it is mixed with the heated water delivered from the heat exchanger 26 through pipe 27a. The diluted concentrate is preferably held in the tank 33 and subjected to agitation by a stirrer 34, so that the added water will dissolve the soluble sugar and other impurities in the concentrate and wash the latter. From tank 33, the diluted concentrate is fed through pump 35 to a second stage centrifuge 36 similar to the centrifuge 29. If desired, part or all of the concentrate from spout 29d may be by-passed around tank 33 through a by-pass line 32a controlled by valve 32b. It will be understood that in any case the water from pipe 27a will be heated sufficiently so that the diluted concentrate entering centrifuge 36 will be at a temperature of about 130° to 150° F.

In the centrifuge 36, the albumin is further concentrated by separating whey, water and lactose therefrom, the albumin concentrate being then discharged into a cover 36c having a spout 36d, while the material separated therefrom (the separated whey constituent) is discharged into a cover 36a having a spout 36b. The albumin concentrate from spout 36d passes through pipe 38 into a collecting tank 39 from which part of the concentrate is returned by pump 40 through pipe 41 to the peripheral part of the bowl of centrifuge 36, the returned concentrate being first diluted with about an equal part of water from pipe 42, as described in connection with Fig. 1 embodiment. The part of the albumin concentrate which is not recycled from tank 39 is withdrawn from the system through pipe 43.

The separated whey constituent discharged from spout 36b is fed to a collecting tank 45 from which it is reintroduced into the system in advance of the second stage centrifuge 36. As shown, a pump 46 delivers whey from tank 45 through pipe 47 to the peripheral part of the separating chamber in the first stage centrifuge 29. Before the recycled whey is introduced into centrifuge 29, it is diluted with water fed into pipe 47 through a pipe 48. Thus, albumin remaining in the whey recycled through pipe 47 is separated in centrifuge 29 and joins the albumin concentrate discharged from the latter. Also, the water introduced into centrifuge 29 from pipe 48 acts to wash the outwardly flowing albumin in the centrifugal bowl and to dissolve impurities which would otherwise discharge with the albumin concentrate. This water for the most part will be displaced inwardly in the separator bowl of centrifuge 29 and discharged through spout $29^b$ with the separated whey constituent.

A pump 50 also delivers whey from tank 45 through a heater 51 where it is heated to a temperature of about 180° F. The heated whey is then fed through a pipe 52 to the precipitating tank 6 where it joins the heated whey introduced through pipe 24 from heater 23. Accordingly, albumin remaining in the whey returning through pipe 52 will be precipitated in tank 6 and treated in the same manner as the original feed. It is to be understood that all or part of the whey from tank 45 may be returned through only one of the pipes 47, 52, or the whey return may be divided between these two pipes. In either case, the albumin in the returned whey serves to supplement the albumin content in the original feed through pipe 24, so that a high yield of albumin can be obtained from the process.

As an example of the operation of the process described in connection with Fig. 2, it can be assumed that for every 100 parts of the feed through pipe 24, 100 parts of water will be fed through heat exchanger 26 and delivered through pipe $27^a$, and that 105 parts of separated whey constituent from tank 45 (all of the discharge from spout $36^b$) will be delivered through pipe 52 to tank 6. The resulting 205 parts fed to the centrifuge 29 will be divided into about 195 parts discharged as the separated whey constituent through spout $29^b$, and about 10 parts of albumin concentrate discharged through spout $29^d$. The latter 10 parts will contain about 5% of albumin and about 2½% or less of lactose, the remainder of the lactose in the feed through pump 28 being discharged with the separated whey constituent through spout $29^b$. This means that approximately 110 parts of feed will be delivered to the second stage centrifuge 36 and will comprise the 10 parts of concentrate from centrifuge 29 and the 100 parts of heated water from pipe $27^a$. The 110 parts of feed to centrifuge 36, which is supplemented by about 5 parts of albumin concentrate diluted and returned through pipe 41, will be divided into about 105 parts of separated whey constituent fed into tank 45 (and subsequently through pipe 52 back to tank 6, as previously described) and about 10 parts of albumin concentrate discharged through spout $36^d$. Of the latter 10 parts, about 5 parts from tank 39 will be diluted and returned through pipe 41 to centrifuge 36, as previously described. Accordingly, about 5 parts of albumin concentrate will be withdrawn from tank 39 through pipe 43, and this final albumin stream will contain approximately 10% of albumin and only about .025% or less of lactose.

In the modified system illustrated in Fig. 3, the acidified whey is heated in tank 6 to a temperature preferably in the order of 190° F., to cause precipitation of the albumin as previously described. The mixture from tank 6 is delivered by pump 54 through pipe 25 extending through heat exchanger 26. In the heat exchanger, the mixture is cooled to a temperature in the order of 150° F. by water entering the exchanger from pipe 27, the heated water leaving the exchanger through pipe $27^a$. I have found that this cooling of the whey serves to prevent excess steaming and foaming of the mixture in the subsequent centrifugal operation. In some instances, such steaming and foaming may not be objectionable, in which case the heat exchanger 26 could be omitted. From the exchanger 26, the mixture is fed through pipe 25 by pump 28 to the centrifuge 29, from which the separated whey constituent (containing most of the lactose in solution) is discharged at $29^b$ and delivered to suitable driers or evaporators for lactose production. The albumin constituent separated in centrifuge 29, after passing through the peripheral nozzles in the separator bowl, is discharged at $29^d$ into a container 55 from which it passes to the collecting tank 33.

In order to reduce the amount of lactose in the albumin concentrate discharged at $29^d$, heated water from the exchanger 26 is fed by pipe $27^a$, pump $46^a$ and pipe 47 to flush tubes in the bowl of centrifuge 29. These flush tubes are so located that they deliver the warm water to the region of the peripheral discharge nozzles for the separated albumin, that is, outside the zone of centrifugal separation. In this manner, the lactose solution is taken up by the stream of water and carried out of the separating chamber with the water. Thus, the stream of water prevents lactose solution from discharging too freely with the albumin, since the water tends to displace the lactose solution inwardly toward the whey discharge. The rate of feed of heated water through pipe 47 may amount to between 100 and 1000 gal./hr. for a discharge rate of about 300 gal./hr. for the concentrated albumin. The excess of heated water will discharge from the separating bowl with the lactose solution and emerge through spout $29^b$. Although it is preferred to feed water through pipe 47 into the flush tubes, it may be desirable in some cases to feed previously concentrated albumin cream into the pipe 47.

The concentrated and partly washed albumin from tank 33 is delivered through pipe 56 to the second stage centrifuge 36. If the albumin concentrate in tank 33 is not sufficiently diluted from the second stage centrifugation, additional water may be introduced into tank 33. This diluent is preferably introduced in a heated condition, and for this purpose heated water from exchanger 26 may be delivered through pipe $27^a$ to tank 33. The diluted albumin constituent, in which most of the lactose has been replaced by pure water, is reheated to a temperature of 170° F. or higher before it is fed to the second stage centrifuge 36.

The effluent or separated whey constituent discharged at $36^b$ from the second centrifuge contains very little lactose. However, in order to obtain maximum yield of lactose and to reduce the loss of some albumin, at least part of this effluent may be delivered through pipes 58 and 59 and used in place of the flush water passing through pump $46^a$ and pipe 47 to the peripheral part of the separating chamber in centrifuge 29. If desired, the effluent from pipe 59 may be mixed with heated water from pipe $27^a$ before feeding it to centrifuge 29.

The reconcentrated and washed albumin is discharged from centrifuge 36 through spout $36^d$ into a container 57 from which it passes to a third collecting tank $39^a$. Albumin is withdrawn from the latter tank and the system through pipe 43 to suitable driers. In order to obtain a higher degree of albumin concentration from the centrifuge 36, part of the albumin from tank 39a is preferably delivered by pump 40 through pipe 41 and suitable flush tubes into the peripheral part of the separating chamber of centrifuge 36. It is best to limit the amount of this recycled albumin concentrate to a maximum of 75 percent of the total albumin discharge from spout 36d. In case it is not essential to obtain the albumin in a highly concentrated state, then instead of returning part of the concentrated albumin from cooling tank 39a, water may be substituted in place of it. As shown, warm flush water is delivered to pipe 41 from heat exchanger 26 through pipes 27a and 27b. This will result in additional washing of the albumin to obtain a still higher degree of purification.

I claim:

1. A process for concentrating and purifying albumin from whey containing albumin and lactose, which comprises adjusting the acidity of the whey to a pH value between 4 and 7, heating the whey to a temperature of about 165° to 190° F., precipitating albumin in the heated whey to form a mixture of whey and precipitated albumin containing lactose, cooling said mixture to a temperature below said first range but no lower than about 130° F., feeding the cooled mixture to a locus of centrifugal force and there separating it into an inner constituent comprising whey and lactose, and an outer constituent comprising albumin, and continuously and separately discharging said outer constituent from the peripheral part of the locus and the inner constituent from the central part of the locus.

2. A process as defined in claim 1, comprising also the steps of diluting at least part of the discharged albumin constituent with water and recentrifuging the same to concentrate the albumin and remove additional lactose therefrom.

3. A process as defined in claim 1, comprising also the steps of feeding the acidulated whey in a continuous stream through a heat transfer zone to heat the same to said first temperature, accumulating a body of heated whey from said zone in a holding space to effect said precipitation, agitating the whey in said space during the precipitation, and continuously cooling a stream of the mixture from said space to said second temperature before feeding the same to said locus.

4. A process as defined in claim 1, comprising also the steps of feeding the acidulated whey in a continuous stream through a heat exchange zone to heat the whey to said first temperature, accumulating a body of heated whey from said zone in a holding space to effect said precipitation, and continuously flowing a stream of the mixture from said space through said zone in heat exchange relation with said first stream to cool the mixture to said second temperature before feeding the same to said locus.

5. A process as defined in claim 1, comprising also the steps of diluting one part of the discharged albumin constituent with water and, during said separation, returning the same to said locus to concentrate the albumin and remove additional lactose therefrom, accumulating another part of the discharged albumin constituent in a holding space and there subjecting it to agitation, and recentrifuging said last part to concentrate the albumin and remove additional lactose therefrom.

6. A process as defined in claim 1, comprising also the steps of diluting one part of the discharged albumin constituent with water and, during said separation, returning the same to said locus to concentrate the albumin and remove additional lactose therefrom, accumulating another part of the discharged albumin constituent in a holding space and diluting said last part with water, and recentrifuging said last part independently of said first separation, to concentrate the albumin and remove additional lactose therefrom.

7. A process as defined in claim 1, comprising also the steps of flowing a stream of said mixture in heat exchange relation with a stream of water to cool the mixture to said second temperature and to heat the water, diluting the discharged albumin constituent from said locus with said heated water, and recentrifuging the diluted constituent to concentrate the albumin and remove additional lactose therefrom.

8. A process as defined in claim 1, comprising also the steps of diluting the discharged albumin constituent from said locus, feeding the diluted constituent to a second locus of centrifugal force and there separating it into an inner constituent comprising whey and lactose and an outer constituent comprising albumin, separately discharged said last constituents from the second locus, and diluting a part of said last albumin constituent with water and returning the same to the second locus during said second separation.

9. A process as defined in claim 1, comprising also the steps of diluting the discharged albumin constituent from said locus, feeding the diluted constituent to a second locus of centrifugal force and there separating it into an inner constituent comprising whey and lactose and an outer constituent comprising albumin, separately discharging said last constituents from the second locus, and feeding part of said last whey and lactose constituent to said first locus during said separation therein.

10. A process as defined in claim 1, comprising also the steps of diluting the discharged albumin constituent from said locus, feeding the diluted constituent to a second locus of centrifugal force and there separating it into an inner constituent comprising whey and lactose and an outer constituent comprising albumin, separately discharging said last constituents from the second locus, diluting part of said last whey and lactose constituent with water, and feeding last diluted part to said first locus during said separation therein.

11. A process as defined in claim 1, comprising also the steps of diluting the discharged albumin constituent from said locus, feeding the diluted constituent to a second locus of centrifugal force and there separating it into an inner constituent comprising whey and lactose and an outer constituent comprising albumin, separately discharging said last constituents from the second locus, and mixing part of said last whey and lactose constituent with said heated whey from which the albumin is precipitated.

12. A process as defined in claim 1, comprising also the steps of diluting the discharged albumin constituent from said locus, feeding the diluted constituent to a second locus of centrifugal force and there separating it into an inner constituent comprising whey and lactose and an outer constituent comprising albumin, separately discharging said last constituents from the second locus, heating part of said last whey and lactose constituent to a temperature of about 165° to 190° F. and mixing said last heated part with said heated whey from which the albumin is precipitated.

13. A process as defined in claim 1, comprising also the steps of diluting the discharged albumin constituent from said locus, feeding the diluted constituent to a second locus of centrifugal force and there separating it into an inner constituent comprising whey and lactose and an outer constituent comprising albumin, separately discharging said last constituents from the second locus, feeding part of said last whey and lactose constituent to said first locus during said separation therein, and mixing another part of said last whey and lactose constituent with said heated whey from which the albumin is precipitated.

14. A process as defined in claim 1, comprising also the step of mixing part of said discharged whey and lactose constituent with said heated whey from which the albumin is precipitated.

15. A process as defined in claim 1, comprising also the steps of adding water to the peripheral part of said locus and causing the added water to displace whey from said outer constituent inwardly toward the discharge of the inner constituent.

16. A process as defined in claim 1, in which said cooling of the mixture is effected by heat exchange with a stream of water, and comprising also the step of feeding heated water from said exchange operation to the peripheral part of the locus while continuing the feed of said cooled mixture to the locus.

17. A process as defined in claim 1, in which said cooling of the mixture is effected by heat exchange with a stream of water, and comprising also the steps of mixing at least part of the discharged albumin constituent with a portion of the heated water from said exchange operation and recentrifuging the same to concentrate the albumin, and feeding another portion of said heated water to the peripheral part of said locus.

18. A process as defined in claim 1, in which said cooling of the mixture is effected by heat exchange with a stream of water, and comprising also the steps of mixing at least part of the discharged albumin constituent with a portion of the heated water from said exchange operation, feeding said last mixture to a second locus of centrifugal force and there separating it into an inner constituent comprising whey and lactose and an outer constituent comprising albumin, separately discharging said last constituents from the second locus, and combining part of said last discharged albumin constituent with another portion of said heated water and recycling the same to the peripheral part of the second locus.

19. A process as defined in claim 1, in which said cooling of the mixture is effected by heat exchange with a stream of water, and comprising also the steps of diluting the discharged albumin constituent and feeding it to a second locus of centrifugal force to separate the same into an inner constituent comprising whey and lactose and an outer constituent comprising albumin, separately discharging said last constituents from the second locus, mixing at least part of said last whey and lactose constituent with a portion of the heated water from the exchange operation and feeding the same to the peripheral portion of the first locus, and mixing another portion of said heated water with part of said last albumin constituent and feeding the same to the peripheral portion of the second locus.

GEORGE J. STREZYNSKI.

REFERENCES CITED

The following references are of record in the file of this patent:

UNITED STATES PATENTS

| Number | Name | Date |
| --- | --- | --- |
| 1,158,959 | Beach | Nov. 2, 1915 |
| 1,870,270 | Washburn | Aug. 9, 1932 |
| 2,023,014 | Flanigan et al. | Dec. 3, 1935 |
| 2,097,531 | Peltzer | Nov. 2, 1937 |
| 2,186,037 | Peltzer | Jan. 9, 1940 |
| 2,316,807 | Peltzer | Apr. 20, 1943 |